United States Patent
Mellier

(10) Patent No.: US 10,081,921 B2
(45) Date of Patent: Sep. 25, 2018

(54) DEVICE FOR DAMPING VIBRATIONS OF A CABLE

(71) Applicant: SOLETANCHE FREYSSINET, Rueil Malmaison (FR)

(72) Inventor: Erik Mellier, Viroflay (FR)

(73) Assignee: SOLETANCHE FREYSSINET, Rueil Malmaison (FR)

( * ) Notice: Subject to any disclaimer, the term of this patent is extended or adjusted under 35 U.S.C. 154(b) by 0 days.

(21) Appl. No.: 15/558,762

(22) PCT Filed: Mar. 16, 2016

(86) PCT No.: PCT/FR2016/050587
§ 371 (c)(1),
(2) Date: Sep. 15, 2017

(87) PCT Pub. No.: WO2016/146947
PCT Pub. Date: Sep. 22, 2016

(65) Prior Publication Data
US 2018/0073207 A1    Mar. 15, 2018

(30) Foreign Application Priority Data
Mar. 16, 2015  (FR) ..................... 15 52141

(51) Int. Cl.
| | | |
|---|---|---|
| *E01D 19/00* | (2006.01) |
| *E01D 19/16* | (2006.01) |
| *E01D 11/04* | (2006.01) |
| *F16F 9/19* | (2006.01) |
| *E01D 19/14* | (2006.01) |
| *F16F 9/54* | (2006.01) |

(52) U.S. Cl.
CPC .............. *E01D 19/16* (2013.01); *E01D 11/04* (2013.01); *E01D 19/14* (2013.01); *F16F 9/19* (2013.01); *F16F 9/54* (2013.01)

(58) Field of Classification Search
CPC ......... E01D 11/04; E01D 19/14; E01D 19/16; F16F 9/19; F16F 9/54
USPC ....................... 14/18–23, 73.5, 78
See application file for complete search history.

(56) References Cited

U.S. PATENT DOCUMENTS

| | | | | |
|---|---|---|---|---|
| 4,280,600 A * | 7/1981 | Salmon | ..................... | F16F 9/36 188/312 |
| 4,648,147 A * | 3/1987 | Zimmermann | ......... | E01D 19/14 14/21 |
| 5,173,982 A * | 12/1992 | Lovett | ..................... | E01D 19/14 14/22 |
| 6,334,608 B1 * | 1/2002 | Stubler | ................... | E01D 19/14 267/136 |
| 7,631,384 B2 * | 12/2009 | Lecinq | ................... | E01D 19/16 14/11 |
| 9,551,120 B2 * | 1/2017 | Annan | ..................... | E01D 19/00 |
| 9,580,876 B2 * | 2/2017 | Stubler | ................... | E01D 19/16 |

(Continued)

FOREIGN PATENT DOCUMENTS

| | | |
|---|---|---|
| EP | 0 716 943 A1 | 6/1996 |
| FR | 2 854 217 A1 | 10/2004 |

(Continued)

*Primary Examiner* — Raymond W Addie
(74) *Attorney, Agent, or Firm* — Dentons US LLP

(57) ABSTRACT

A vibration damping device for suspension-bridge type cables includes first and second linear dampers supported by a generally V-shaped support member mounted to the bridge deck.

16 Claims, 5 Drawing Sheets

(56) References Cited

U.S. PATENT DOCUMENTS

| | | | |
|---|---|---|---|
| 9,617,697 B2* | 4/2017 | Stubler | .................. E01D 11/04 |
| 9,714,489 B2* | 7/2017 | Stubler | .................. E01D 11/04 |
| 2004/0222058 A1 | 11/2004 | Domange | |
| 2005/0072895 A1 | 4/2005 | Messein et al. | |
| 2015/0014904 A1* | 1/2015 | Tirelli | .................. E01D 19/16 |
| | | | 267/140.2 |

FOREIGN PATENT DOCUMENTS

| | | |
|---|---|---|
| FR | 2 859 260 A1 | 3/2005 |
| JP | H09-59921 A | 3/1997 |

* cited by examiner

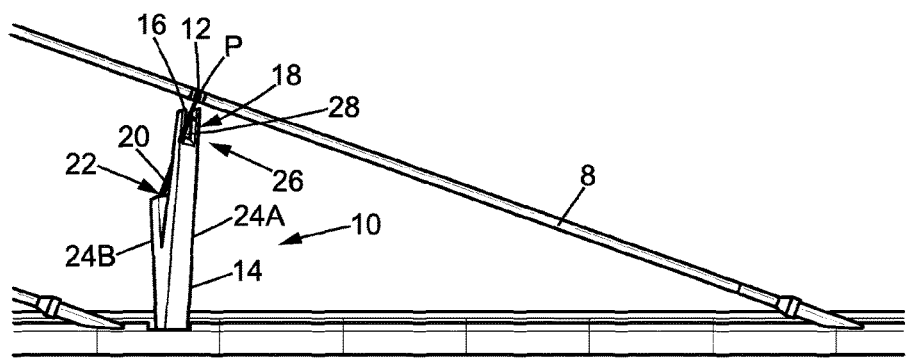
FIG. 2
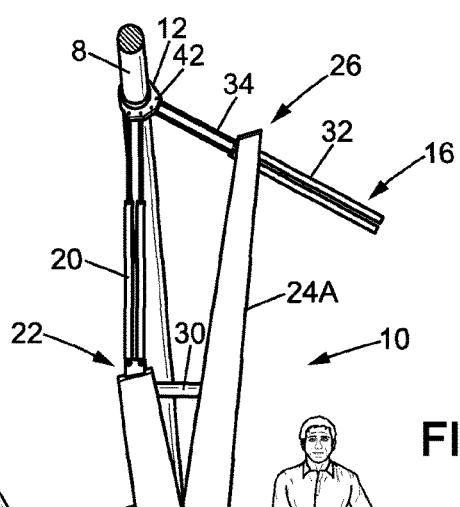
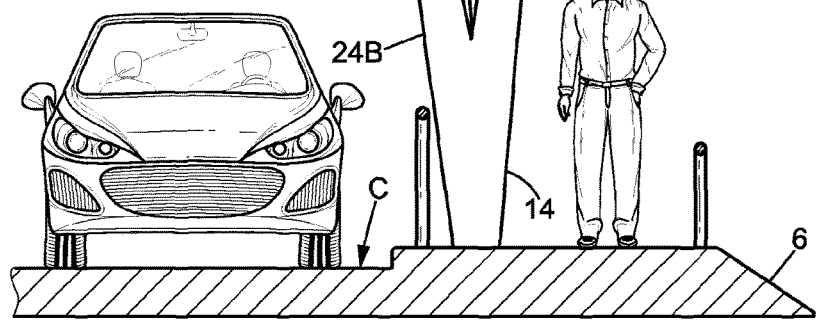
FIG. 3

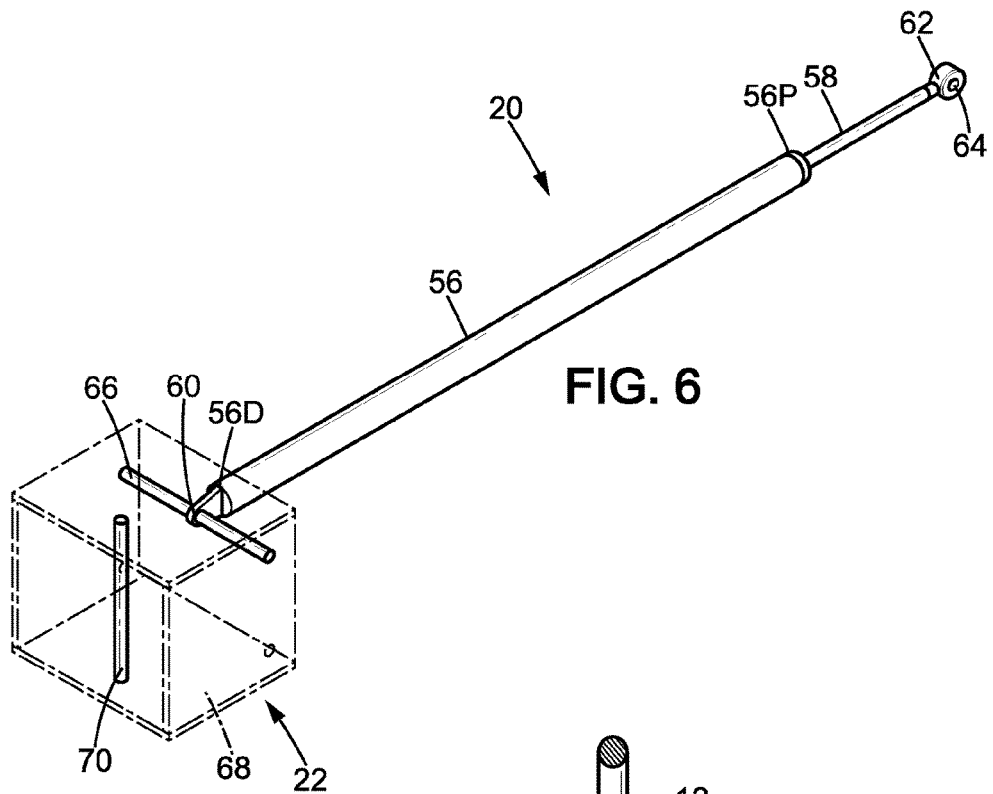
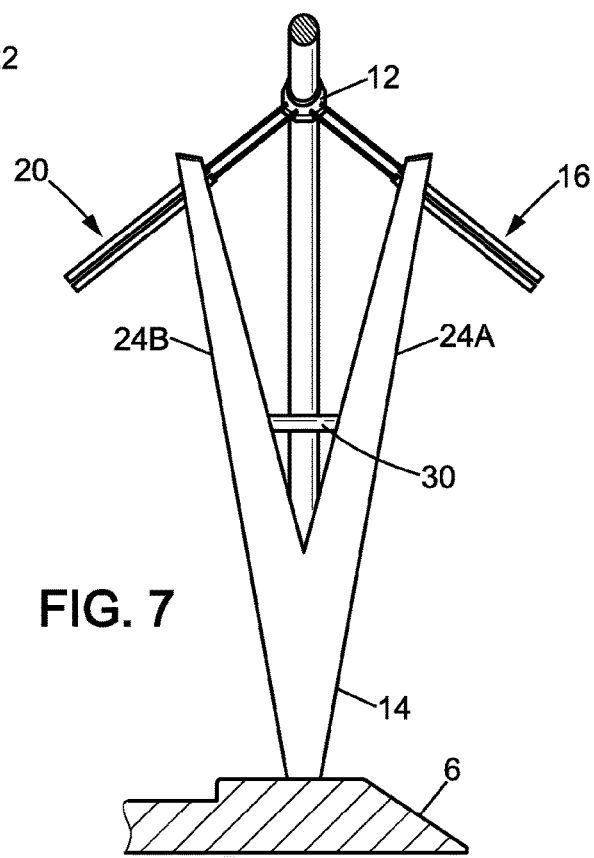

DEVICE FOR DAMPING VIBRATIONS OF A CABLE

This application is a National Stage Application of International Application No. PCT/FR2016/050587 filed on Mar. 16, 2016, which claims priority to and the benefit of French Application FR1552141, filed Mar. 16, 2015 each of which is hereby incorporated by reference in its entirety for all purposes as if fully set forth herein.

This invention relates to damping techniques for vibrations that cables used to support engineered structures are subject to.

In particular, it is applied to bridge stay cables. The stay cables vibrate, in particular because of climatic actions such as wind, rain or frost, but also because of traffic over the structure. In order to dampen these vibrations, different types of devices have been proposed.

In a first type of damping device, the damping of vibrations is ensured by a damping device known as internal, in other words, by dampers disposed directly between the cable of the structure and another element of the structure supported by this work, like a tube fixed to the supported structure (a bridge decking, for example), and containing the lower section of the cable (see, for example, FR 2 859 260 A1).

This type of device however reaches its limits when the cables become very long. Thus, a second type of device known as external and disposed between the cable to be damped and the bridge decking is used. In particular, in long-length cable configurations, it is known to use damping devices comprising a support, for example, in a T or A shape, fixed to the bridge decking in question, and whereon the ends of linear dampers are fixed. The opposite ends of these dampers are attached to the cable to be damped by the intermediary of a collar, through which the vibrations of the cable are transmitted.

Devices of this type are suitable to effectively dampen the vibrations from long-length cables. However, they also have disadvantages. Indeed, the travel of very long cables induced by vibrations is significant, which involves positioning dampers having a large run and, by extension, a support having significant dimensions. This support volume is problematic insofar as the space available on the decking is limited, which can result in a conflict with the clearance of pedestrians and vehicles on the bridge.

An aim of the invention is to perfect this type of device for long-length cables.

The invention is based on a cable vibration damping device, the device comprising:
  a support,
  at least one first damper to dampen the vibrations of the cable, the first damper comprising a first element and a second element, telescopically moveable one relative to the other, the second element being intended to be fixed to the cable, the first element having a distal end and a proximal end in relation to the cable, and
  a fixing disposed on the support to fix the first damper to the support, the fixing being fixed to the first damper at a place along the first damper located away from the distal end of the first element in the direction of the proximal end.

Because of the arrangement of the first damper in relation to the support, the volume, and in particular, the length of the damper, is less of a sizing factor of the support. The dimensions of the support, and in particular its width, can therefore be reduced in relation to the support of the type of device described above.

According to another aspect of the invention, said place is located at a distance from the distal end of the first element of the first damper, more than or equal to 25%, and preferable more than or equal to 50% of the length of the first element.

According to another aspect of the invention, the first element is a body of the first damper and the second element is a rod that is telescopically moveable in relation to the body, the fixing being fixed to the first element.

According to another aspect of the invention, the first element is a rod of the first damper and the second element is a body of the first damper, the rod being telescopically moveable in relation to the body.

According to another aspect of the invention, the fixing comprises levels, a plate assembled on the levels so that it pivots around a first axis, the plate comprising a central passage wherein the first damper is disposed, the first damper being assembled in the central passage, pivoting in relation to the plate, around a second axis.

According to another aspect of the invention, the fixing comprises pins, one held between the plate and the first damper and additional receiving orifices held by the other between the plate and the first damper, the first damper being fixed to the plate cooperating with the pins and the receiving orifices.

According to another aspect of the invention, in a usage configuration wherein the support is fixed to a receiving structure and the first damper is fixed to the cable and to the support, the first damper is tilted in relation to a vertical plane wherein the cable extends.

According to another aspect of the invention, the support comprises a hole wherein the fixing is disposed and through which the first or each damper is positioned.

According to another aspect of the invention, the hole comprises a central surface and at least one tilted surface, oriented away from the fixing and located just under the first damper.

According to another aspect of the invention, the device further comprises at least one second damper to dampen the vibrations of the cable, the second damper comprising a first element and a second element, telescopically moveable one over the other, the second element being intended to be fixed to the cable, said first element being fixed to the support by a second fixing.

According to another aspect of the invention, the second fixing is fixed to the first element of the second damper at the distal end of the first element of said second damper in relation to the cable.

According to another aspect of the invention, the or each second damper extends in a vertical plane wherein the cable extends.

According to another aspect of the invention, the second fixing is fixed to the second damper at a place along the first element of the second damper located away from the distal end of the first element.

According to another aspect of the invention, in a usage configuration wherein the support is fixed to a receiving structure and the second damper is fixed to the cable and to the support, the second damper is tilted in relation to a vertical plane wherein the cable extends.

According to an aspect of the invention, the damping device is an external damping device, a lower end of the support being fixed to a bridge decking, the support extending from the bridge decking in the direction of the cable.

The invention also relates to a cable-stayed bridge comprising at least one pylon, a decking, stay cables constituted of cables extending obliquely between the pylon and the decking to support the decking, and at least one damping device such as defined above, assembled between a stay cable and the decking.

The invention will be best understood upon reading the description which will follow in detail, given only as an example and made in reference to the appended Figures, whereon:

FIG. 2 is a schematic illustration of a longitudinal view of a damping device according to the invention;

FIG. 3 is a schematic illustration of a cross-sectional view of a damping device according to the invention;

FIG. 6 is an illustration of a second damper and fixing means of the second damper in a damping device according to the invention;

FIG. 7 is an illustration of a damping device according to a variant of the invention.

The invention is described below in its non-exhaustive application to cable-stayed bridges. The cables for which the vibrations are to be damped, are thus stay cables. These vibrations are, for example, due to the passing of vehicles over the bridge in question, due to the wind, etc.

Figure 1:
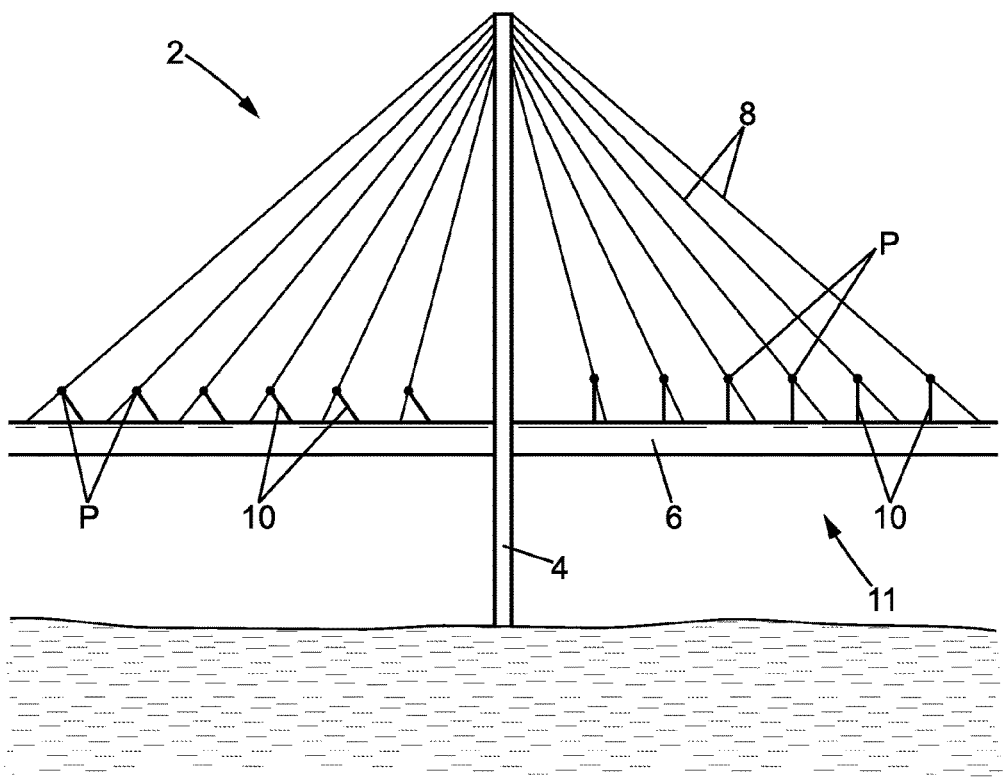
FIG. 1 is a schematic illustration of a cable-stayed bridge according to the invention.

FIG. 1 illustrates a cable-stayed bridge 2 according to the invention. The bridge 2 comprises pylons 4, a decking 6 and stay cables 8 extending between one of the pylons 4 and the decking 6 to support the decking 6.

One or several stay cables 8 are equipped with a damping device 10 according to the invention, below device 10. As indicated previously, the device 10 is an external device. The device 10 extends substantially transversally to the corresponding stay cable 8 between a point of attachment P of the stay cable 8 and the decking 6. The point of attachment P is, for example, located near the low anchorage of the stay cable (for example, a few % of the total length of the stay cable 8).

In reference to FIG. 2, the device 10 is fixed to the stay cable 8 at the point of attachment P by the intermediary of a collar 12 surrounding the stay cable 8 and wherein the damper ends of the device 10 described below are received.

The device 10 comprises a support 14, of the first dampers 16 and the fixing means 18 of the first dampers 16 to the support 14. The device 10 further comprises the second dampers 20 and the fixing means 22 of the second dampers 20 to the support 14.

The support 14 is also known as a frame. In reference to FIGS. 2 and 3, the support 14 fixed at its lower end to the decking 6 of the bridge 2. As illustrated in FIG. 2, the support 14 extends from the decking 6 in the direction of the stay cable 8. It extends substantially transversally to the stay cable. As described further in detail below, it can extend orthogonally to the stay cable or not. Advantageously, the support 14 is immobile in relation to the decking 6.

The support 14 extends substantially according to a plane. The plane of the support is preferably substantially orthogonal in the direction of the stay cable 8. However, other orientations can be considered. In particular, in certain embodiments, the support 14 extends substantially orthogonally to the decking 6 and is not orthogonal to the stay cable 8, the stay cable being tilted in relation to the decking 6. In practice, the support 14 can be positioned on the decking 6 so that it is located between a position wherein it is substantially orthogonal to the decking 6 and a position wherein it is substantially orthogonal to the stay cable 8.

The support 14 has a general V shape and has two arms. The arms are of respective different lengths. The longest arm, below arm 24A, has a free end 26 laterally offset in relation to the section of the stay cable 8 which overhangs it.

The first dampers 16 are fixed to this free end 26 via the fixing means 18. To this end, the free end 26 comprises a hole 28 (FIG. 5) wherein the fixing means 18 are disposed and through which the first dampers 16 are positioned. In reference to FIG. 5, the hole 28 comprises, for example, a flat central surface 28C, and two tilted surfaces 28I on either side of the central surface 28C and located just under the first dampers 16. These tilted surfaces 28I are oriented away from the fixing means 18. As described in more detail below, the presence of these tilted surfaces 28I enables the angular articulation of the first dampers to be increased, when these are caused to pivot in relation to the support 14.

The shortest arm of the support 14, below arm 24B (FIGS. 2 and 3), has a free end located substantially just under the stay cable 8 and on the level of which the two dampers 20 are fixed via the fixing means 22.

In certain embodiments, the support 14 further comprises a frame 30 (FIG. 3) extending between the two arms 24A, 24B. This frame is presented, for example, in the form of a rod positioned substantially horizontally and anchored in the arms at their ends. The frame 30 gives higher rigidity to the arms requested by the dampers 16, 20 and thus improves the overall rigidity of the support offered to the damper device by the support 14.

The support 14 is made from a material that has good mechanical stability and good resistance to corrosion, and/or has a surface treatment against corrosion. Advantageously, the support 14 is made from steel.

In reference to FIGS. 2 to 5, the first dampers 16 are preferably linear dampers. For example, the first dampers are actuators, such as hydraulic actuators, and dampen vibrations of the stay cable 8 by viscous damping. In the embodiment illustrated by these Figures, the device 10 comprises two first dampers 16. The first dampers 16 are disposed parallel to each other. Furthermore, they extend substantially transversally to the stay cable 8. Moreover, the first dampers 16 are tilted in relation to the vertical plane of the stay cable 8 in the usage configuration of the device 10, wherein the support 14 is fixed to the decking 6 which forms a receiving structure of the support 14, and wherein the first dampers 16 are fixed to the collar 12 surrounding the stay cable 8. By "tilted in relation to the vertical plane of the stay cable 8", here this means that the first dampers extend following a direction forming a significant angle with the vertical plane of the stay cable 8.

Figure 4:
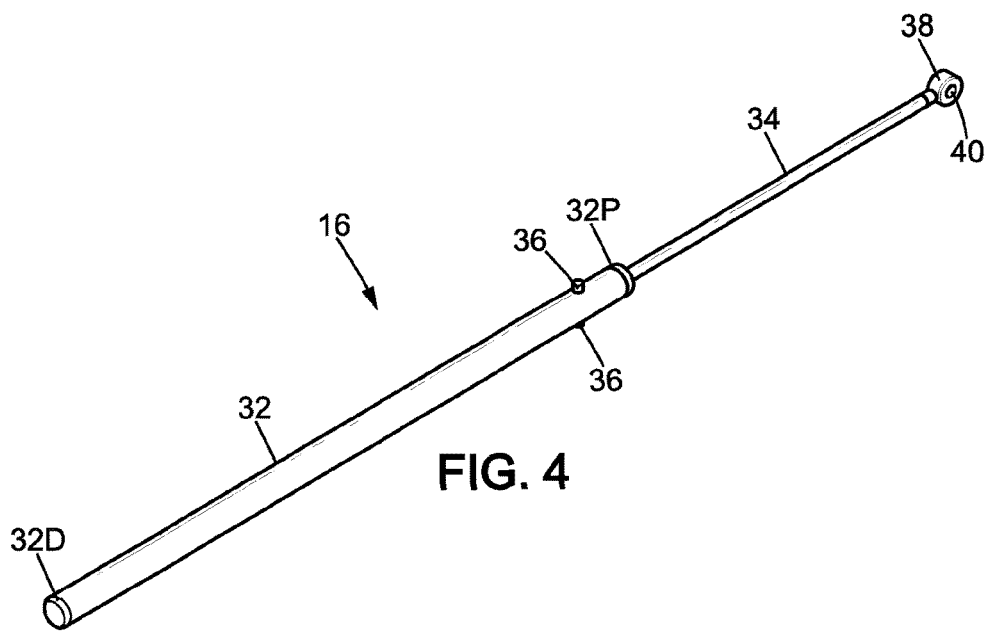
FIG. 4 is a schematic illustration of a first damper of a damping device according to the invention.

In reference to FIG. 4, each first damper 16 comprises a first element 32 and a second element 34 telescopically moveable, one over the other. For example, the elements 32 and 34 slide one over the other. Thus, these elements slide, for example, one over the other.

The first element 32 is fixed to the support 14, and the second element 34 is fixed to the stay cable 8 by the intermediary of the collar 12. These two elements 32, 34 correspond in practice to one among the body, or cylinder, of the first damper 16 and a rod of this first damper. The description which follows will be made non-exhaustively in the event where the first element 32 corresponds to the body and the second element corresponds to the rod.

The body 32 is substantially cylindrical. The body 32 comprises a distal end 32D and a proximal end 32P in relation to the stay cable 8 to which the device 10 is connected. Furthermore, the body 32 comprises two pins 36 forming part of the fixing means 18. These pins are presented in the form of radial juts, generally cylindrical in shape. These pins 36 are positioned on either side of the body 32 on one same radial axis. The pins 36 are positioned at a place along the body 32 located away from the distal end 32D and in the direction of the proximal end 32P, or at the proximal end 32P itself. In other words, the pins 36 are located at an intermediary place along the body 32, or at the proximal end 32P. Preferably, the pins 36 are located at a distance from the distal end 32D more than or equal to 25% of the length of the body 32, and advantageously more than or equal to 50% of this length. In the example in FIG. 4, they are located at around 90% of this length.

In reference to FIG. 4, the rod 34 is telescopically moveable in relation to the body. For example, the rod 34 is inserted in the body 32. The rod 34 is fixed to an end at a moveable piston (not represented) in the body 32 and via which the viscous damper of the movements of the rod 34 is implemented. At its other end, the rod 34 is inserted in the collar 12. More specifically, the rod 34 comprises a head 38 provided with an orifice 40 receiving an axis 42 (FIG. 3) of the collar 12 around which the rod 34 can pivot.

Figure 5:
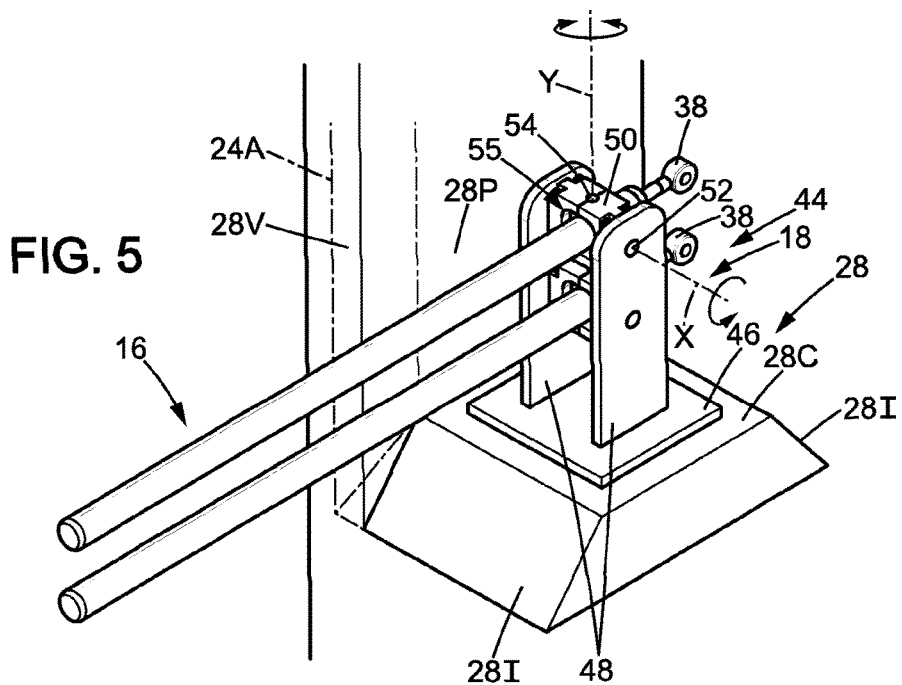
FIG. 5 is an illustration of a fixing of fixing means of a first damper to a support of the damping device according to the invention.

In reference to FIG. 5, the fixing means 18 comprise a gimbal fixing 44 enabling the rotation of the first dampers 16 in question, in relation to the support 14 according to two orthogonal axes.

The fixing 44 is disposed on the support 14. The fixing 44 comprises a base 46 fixed on the central surface 28C of the hole 28, and two levels 48 fixed perpendicularly to the base 46 opposite each other. The base and the levels are shared with the first dampers 16.

The fixing 44 also comprises, for each first damper 16, a pin plate 50 52 provided with a central passage 55 wherein the body 32 of the damper 16 in question is inserted. The central passage 55 has dimensions larger than the section of the body 32, so that the body 32 is not kept immobile by the edges of the central passage 55. As described below, this enables the relative rotation of the body 32 in relation to the plate 50 in the passage 55.

The plate 50 is fixed to the levels 48 by its two cylindrical pins 52 extending coaxially from both of the two portions opposite the plate 50, enabling the rotation of the plate 50 around an X-axis. This X-axis corresponds to the direction according to which the pins 52 extend. The plate 50 furthermore has two coaxial receiving orifices 54 in each one of which, one of the pins 36 of the body 32 of the first damper 16 is received so that it can be moved (only one orifice 54 is illustrated in FIG. 5). These orifices 54 are disposed opposite each other in either of the portions of the plate 50 which are not opposite the levels 48. These orifices 52 enable the rotation of the first damper 16 around a Y-axis (corresponding to the orifice 54 axis) substantially orthogonal to the X-axis. This Y-axis is substantially parallel to the levels 48.

In reference to FIG. 6, the second dampers 20 are advantageously linear dampers. For example, the dampers 20 are actuators, such as hydraulic actuators. The second dampers 20 extend substantially transversally to the connected stay cable 8. Furthermore, they extend substantially in the vertical plane of the connected stay cable 8.

Each second damper 20 comprises a first element 56 and a second element 58 telescopically moveable, one over the other. As for the first dampers, these first and second elements correspond to a body or to a rod of the second damper. The description which follows is made in the non-exhaustive event, wherein the first element 56 corresponds to the body and the second element 58 corresponds to the rod.

The body 56 has a generally cylindrical shape. Furthermore, it comprises a distal end 56D and a proximal end 56P in relation to the stay cable 8 and to the level of which is disposed a passage orifice 60 of a fixing axis of the fixing means 22.

The rod 58 is substantially identical to the rod 34 of the first dampers 16. It comprises an end fixed on a mobile piston (not represented) in the body 56, and, at its other end, a head 62 provided with a receiving passage 64 of an axis 42 of the collar 12.

Still in reference to FIG. 6, the fixing means 22 comprise, for each second damper 20, a fixing axis 66 received in the orifice 60 of the body 56 of the second corresponding damper 20. Furthermore, the fixing means 22 comprise a subfloor 68 wherein the fixing axis/axes 66 of the first damper(s) are received. This subfloor 68 is fixed to the support 14 at the end of the short arm 24B. Preferably, the subfloor 68 is fixed to the support 14 by the intermediary of an axis 70 substantially orthogonal to the fixing axis/axes 66. The fixing means 22 thus define a gimbal fixing enabling the rotation of the second damper 20 in relation to two orthogonal axes. As described in more detail below, this enables the second dampers to support the longitudinal movements of the point P of the stay cable 8, for example, because of the stay cable's heat expansion, and to support the movements of the point P parallel to the plane in FIG. 3 without the second dampers 20 being subject to any flexion.

The functioning of the device 10 will now be described.

During the functioning of the device 10, the stay cable 8 is subject to vibrations and dilates under the effect of temperature variations. These vibrations and dilatations translate into movements from the point of attachment P, both to the stay cable 8 and also longitudinally. These vibrations and movements from the point of attachment P are communicated to the device 10 by the intermediary of the collar 12, to which the free ends of the rods 34 and 58 of the first and second dampers 16, 20 are fixed. The movements from point P transversally to the stay cable cause a movement of the rods 34, 58 in the body 32, 56 of the corresponding damper. The energy from these movements is then dissipated in the corresponding damper by viscous damping.

Furthermore, when the point of attachment P moves longitudinally, the dampers 16, 20 pivot in relation to the support 14 according to the rotating axes enabled by the corresponding fixing means 18, 22 and also follow the movements of the point P without being subject to flexion. In particular, the first dampers 16 pivot in the hole 28. The rotation of the rods 34, 58 of the dampers 16, 20 in relation to the collar 12 also limits the flexions applied to the dampers during the movements of the point of attachment P.

The damper device 10 according to the invention has many advantages.

In particular, the fixing of the first dampers to a place along these dampers located away from the distal end of the first elements, enables the clearance from the support to be reduced. Indeed, the length of the dampers is thus a highly significant criterion for the support, contrary to a configuration wherein the damper is fixed to the support at the distal end of the first element 32. This arrangement reduces the space occupied by the support at decking-level, which limits the difficulty for vehicles and pedestrians to travel, that the support could lead to. This is all the clearer, that the place of the fixing of the dampers to the support is distant from the distal end of the first elements 32 of the dampers in relation to the stay cable that they are intended to dampen. Furthermore, this is particularly advantageous when the first dampers are tilted in relation to the vertical plane wherein the stay cable extends substantially.

Furthermore, the arrangement of the second dampers substantially just under the connected stay cable 8 further contributes to reducing the volume of the device 10, in particular its lateral dimensions. Advantageously, in order to make the most of this low lateral volume, the support 14 is fixed to the decking 6, the support arm 24B being oriented towards a road C (illustrated in FIG. 3) of the bridge 2 whereon vehicles travel, the arm 24A being oriented away from this road. As illustrated in FIG. 3, the device thus enables the passage of pedestrians on the decking, for example, between the support 14 and the edge of the deckling, while not obstructing traffic on the road C.

The embodiments described and discussed above are illustrations of this invention. Various modifications can be applied to it, without moving away from the framework of the invention which is apparent of the appended claims.

In particular, the device has been described as comprising two first dampers 16 and two second dampers 20. Alternatively, the device 10 comprises one single or more than two first dampers 16. Furthermore, in certain embodiments, independently from the number of first dampers 16, the device 10 comprises one single or more than two second dampers 20.

Moreover, the pins 36 have been described as held by the first dampers 16. However, as a variant, the pins are held by the plate 50 and the orifices 54 are held by the first dampers 16.

Furthermore, the fixing 44 has been described as comprising a base 46 fixed to the support at the central surface 28C. However, as a variant, the base 46 is fixed to a lateral wall 28P of the hole 28. As a variant still, the fixing 44 has no base 46 and is fixed to the support 14 by its levels 48.

Moreover, the base 46 and the levels 48 have been described as being shared with the first dampers 16. As a variant, the fixing means comprise, for each first damper of the levels fixed to the support, or the levels and a base fixed to the support.

Furthermore, in certain embodiments, the hole 28 comprises one single tilted surface 28I. As a variant, the hole 28 also or alternatively comprises vertical tilted surfaces 28V disposed in lateral walls of the hole 28 (as a dotted line in FIG. 5). These vertical tilted surfaces 28V are oriented away from the fixing means 18. They thus enable the angular articulation to be increased from the first dampers when these pivot around the Y-axis, in the same way as the tilted surfaces 28I enable the angular articulation to be increased from the first dampers around the X-axis.

Moreover, the second dampers 20 have been described as extending transversally to the stay cable 8 and substantially in the vertical plane of the stay cable 8. However, in reference to FIG. 7, as a variant, the second dampers 20 have a similar arrangement to those of the first dampers 16. More specifically, the support 14 is substantially symmetrical in relation to a plane. The support 14 is, for example, disposed on the decking so that this symmetrical plane substantially corresponds to the vertical plane of the stay cable 8 in the usage configuration of the device 10. The arm 24B is of the same length as the arm 24A and also has, at its end, a similar hole 28 to that of the arm 24A. The second dampers 20 are received in this hole 28 of the arm 24B and are fixed there via the fixing means 22. The second dampers 20 are fixed on the arm 24B at a place along their body 56 located away from the distal end 56D of this body, and in the direction of the proximal end 56P. Furthermore, they are, in relation to the vertical plane of the stay cable 8. The fixing means 22 have a gimbal structure, similar to the fixing means 18 structure described above, and enable the relative rotation of the second dampers 20 in relation to the support 14 according to two orthogonal axes.

Furthermore, the plane according to which the support 14 extends, can be orthogonal to the vertical plane of the stay cable. Alternatively, the support plane can have other orientations in relation to the vertical plane of the stay cable, in other words, that the support 14 can be fixed on the decking, so that it is pivoted on itself and that the support plane is not orthogonal to the vertical plane of the stay cable.

Moreover, the fixing means 18 have been described as comprising a gimbal fixing enabling a rotation of the first dampers 16 in relation to the support 14 according to two orthogonal axes.

As a variant, the fixing means 18 only enable the rotation of the first dampers around one single axis. For example, the plate 50 is fixed so that it cannot be moved to the levels 48 of the fixing 44, or the body 32 is fixed rigidly to the corresponding plate 50.

As a variant still, the fixing 44 is formed by an elastic ball, separate from the body 32 and intended to cooperate with the cavities disposed in the walls of the hole 28 of the support 14. This ball also enables the rotation of the first corresponding damper 16 according to the two orthogonal X- and Y-axes described above. As previously, the ball is fixed on the body 32 of the first damper 16 corresponding to a place along the body 32 located away from the distal end 32D of the body.

In other embodiments, the second dampers 20 are disposed in the vertical plane of the stay cable 8 and transversally to it, but are fixed to the support 14, not by their distal end (rear), but to a place along the body located away from their distal end, like for the first dampers 16. In such a variant, the arm 24B is longer than in the embodiment in FIGS. 2 and 3, and its free end is located just under the stay cable 8. This end has no similar hole 28 to that of the arm 24A wherein the fixing means 22 are disposed and through which the second dampers 20 are received. The fixing means 22 are similar to the fixing means 18 described previously and comprise a gimbal fixing enabling the rotation of the second dampers in relation to the support 14 according to two orthogonal axes.

Moreover, the description has been given above, in the event where the first element 32 of the dampers corresponds to the body of these dampers, and the second element 34 corresponds to their rod. However, other embodiments can be considered.

Figure 8A:
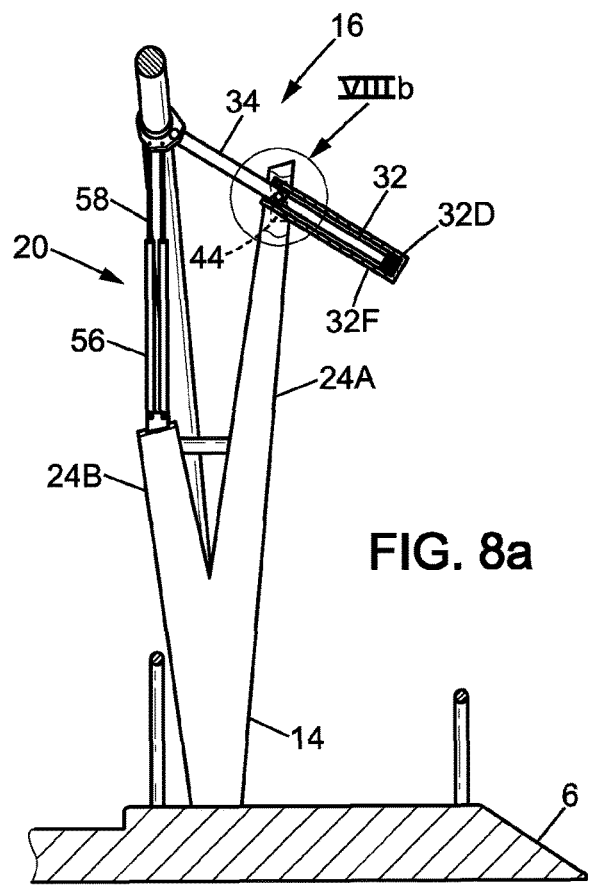
FIGS. 8a and 8b illustrate a damping device according to another variant of the invention.
Figure 8B:
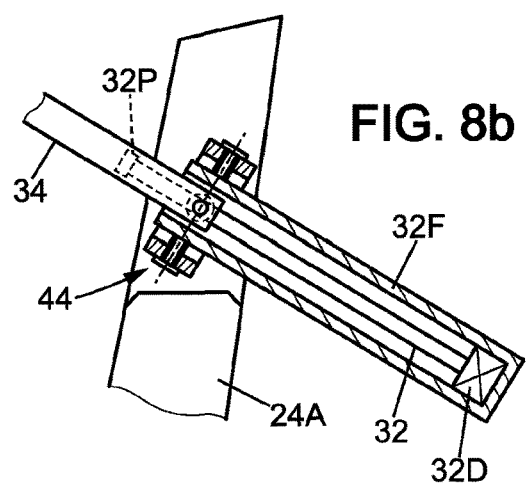

As a variant, in reference to FIGS. 8a and 8b, for at least one first damper 16, the second element 34 corresponds to the body of the damper and the first element 32 corresponds to the rod. The first damper 16 further comprises a shell 32F wherein the rod 32 is received. In this embodiment, the first damper 16 (or possibly all or part of the different first dampers) is fixed to the support 14 by the intermediary of the shell 32F wherein the rod 32 is received.

The shell 32 has a general cylindrical shape disposed coaxially in relation to the rod 32 and to the body 34. The shell 32F has a distal end (in relation to the stay cable 8) which is closed, and an overflowing proximal end for the insertion of the rod 32. The distal end 32D of the rod 32 is fixed to the distal end of the shell 32F, in other words, at the bottom of the shell 32F. This fixing is, for example, achieved by integration. Moreover, the shell 32F is fixed to the support 14 at the arm 24A in the same way as the body in the embodiments described above. In other words, the shell 32F is fixed to the support 14 by a gimbal fixing such as the fixing 44. This fixing is located at a place along the damper which is located away from the distal end 32D of the rod 32. This fixing 44 is fixed in a hole of the arm 24A and comprises, for example, corresponding pins and orifices held to each other between a fixing plate 44 and the shell 32F, the plate itself being assembled pivoting on the levels of the fixing around an axis orthogonal to it, around which the rotation of the shell 32F in relation to the plate is brought about.

Without this being its main function, the presence of the shell 32F has the purpose of protecting the rod 32 from mechanical and climatic stresses. Advantageously, a section of the body 34 is also disposed in the shell 32F, which extends the protection given by the shell 32F to this section of the body 34. In this configuration, to avoid runoff water stagnation and accumulation or condensation, a mobile protection, such as for example, a flexible bellow (not represented) can be disposed on the body 34, at the proximal end of the shell 32F. Alternatively or at the same time, one or several drainage holes can be applied to the bottom end of the shell 32F.

In certain embodiments, the results described above and which are technically compatible to each other are combined.

The invention claimed is:

1. A device for damping vibrations of a cable, the device comprising:
    a support,
    at least one first damper to dampen the vibrations of the cable, the first damper comprising a first element and a second element, telescopically moveable, one relative to the other, the second element being intended to be fixed to the cable, the first element having a distal end and a proximal end in relation to the cable, and
    a fixing disposed on the support to fix the first damper to the support, the fixing being fixed to the first damper at a place along the first damper located away from the distal end of the first element in the direction of the proximal end.

2. The damping device according to claim 1, wherein said place is located at a distance from the distal end of the first element of the first damper, more than or equal to 25%, and preferably more than or equal to 50% of the length of the first element.

3. The damping device according to claim 1, wherein the first element is a body of the first damper and the second element is a rod, telescopically moveable in relation to the body, the fixing being fixed to the first element.

4. The damping device according to claim 1, wherein the first element is a rod of the first damper and the second element is a body of the first damper, the rod being telescopically moveable in relation to the body.

5. The damping device according to claim 1, wherein the fixing comprises levels, a plate assembled on the levels, pivoting around a first axis, the plate comprising a central passage wherein the first damper is disposed, the first damper being assembled in the central passage, pivoting in relation to the plate around a second axis.

6. The damping device according to claim 5, wherein the fixing comprises pins held by one between the plate and the first damper, and the additional receiving orifices held by the other between the plate and the first damper, the first damper being fixed to the plate by cooperation of the pins and the receiving orifices.

7. The damping device according to claim 1, wherein, in a usage configuration wherein the support is fixed to a receiving structure and the first damper is fixed to the cable and to the support, the first damper is tilted in relation to the vertical plane wherein the cable extends.

8. The damping device according to claim 1, wherein the support comprises a hole wherein the fixing is disposed and through which the or each first damper is positioned.

9. The damping device according to claim 8, wherein the hole comprises a central surface and at least one tilted surface oriented away from the fixing and located just under the first damper.

10. The damping device according to claim 1, further comprising:
    at least one second damper to dampen the vibrations of the cable, the second damper comprising a first element and a second element, telescopically moveable, one over the other, the second element being intended to be fixed to the cable, said first element being fixed to the support by a second fixing.

11. The damping device according to claim 10, wherein the second fixing is fixed to the first element of the second damper at the distal end of the first element of said second damper in relation to the cable.

12. The damping device according to claim 10, wherein the or each second damper extends in a vertical plane wherein the cable extends.

13. The damping device according to claim 10, wherein the second fixing is fixed to the second damper at a place along the first element of the second damper located away from the distal end of the first element.

14. The damping device according to claim 13, wherein, in a usage configuration wherein the support is fixed to a receiving structure and the second damper is fixed to the cable and to the support, the second damper is tilted in relation to a vertical plane wherein the cable extends.

15. The damping device according to claim 1, wherein the damping device is an external damping device, a lower end of the support being fixed to a bridge decking, the support extending from the bridge decking in the direction of the cable.

16. A cable-stayed bridge, comprising at least one pylon, a decking, stay cables constituted of cables extending obliquely between the pylon and the decking to support the decking, and at least one damping device according to claim 1 assembled between a stay cable and the decking.

* * * * *